United States Patent [19]
Saito

[11] Patent Number: 6,035,395
[45] Date of Patent: Mar. 7, 2000

[54] COMPUTER SYSTEM CAPABLE OF USING REMOVABLE DISK DRIVE AS BOOT DEVICE AND METHOD OF CONTROLLING BOOTSTRAP

[75] Inventor: Toshimitsu Saito, Tokyo, Japan

[73] Assignee: Kabushiki Kaisha Toshiba, Kawasaki, Japan

[21] Appl. No.: 08/978,743

[22] Filed: Nov. 26, 1997

[30] Foreign Application Priority Data

Mar. 28, 1997 [JP] Japan ................................ 9-077730

[51] Int. Cl.[7] .......................................... G06F 9/24
[52] U.S. Cl. ................................................... 713/1
[58] Field of Search ..................................... 713/1

[56] References Cited

U.S. PATENT DOCUMENTS

| | | |
|---|---|---|
| 5,130,961 | 7/1992 | Namiki ........................ 396/6 |
| 5,274,816 | 12/1993 | Oka ............................ 395/700 |
| 5,278,808 | 1/1994 | Takano ........................ 369/11 |
| 5,418,918 | 5/1995 | Vander Kamp et al. ......... 395/375 |
| 5,694,583 | 12/1997 | Williams et al. .............. 395/500 |

FOREIGN PATENT DOCUMENTS 4-138522  5/1992  Japan .

*Primary Examiner*—David Y. Eng
*Attorney, Agent, or Firm*—Finnegan, Henderson, Farabow, Garrett & Dunner, L.L.P.

[57] ABSTRACT

If a boot device is a CD-ROM drive, whether a CD-ROM medium is loaded in the CD-ROM drive is checked. When no medium is loaded, a tray open command is issued to the CD-ROM drive to automatically open the tray before starting a boot process from another device such as an HDD. When the user sets the CD-ROM medium on the tray and closes the tray, the bootstrap of an operating system from the CD-ROM medium is executed.

10 Claims, 7 Drawing Sheets

SYSTEM SETUP

BIOS VERSION = *. **

MEMORY
```
TOTAL             = 16384KB
BASE              = 640KB
EXTENDED          = 15552KB
SHADOW BIOS ROM   = 192KB
```

DISPLAY
```
DISPLAY ADAPTOR     = VGA COMPATIBLE
LCD DISPLAY MODE    = COLOR
VGA SEGMENT ADDRESS = E400H
LCD DISPLAY COLORS  = 16M COLORS
POWER ON DISPLAY    = INTERNAL/EXTERNAL
TEXT MODE STRETCH   = DISABLED
```

HARD DISK
```
HDD MODE   = ENHANCED IDE (NORMAL)
```

PASSWORD
```
NOT REGISTERED
```

I/O PORTS
```
SERIAL   = COM1 (3F8H/IRQ4)
INFRARED = NOT USED
PARALLEL = LPT1 (378H/IRQ7/CH3)
SOUND    = ADDRESS/IRQ/DMA
```

OTHERS
```
POWER-UP MODE      = BOOT
CPU CACHE          = ENABLED
BATTERY SAVE MODE  = FULL POWER
ALARM VOLUME       = HIGH
SYSTEM BEEP        = ENABLED

ALARM POWER ON     = DISABLED

POINTING DEVICES   = AUTO-SELECTED
BOOT PRIORITY      = FDD→HDD→CD-ROM
```

↑↓←→ :SELECT ITEMS  SPACE,BkSp:CHANGE VALUES  END:SAVE CHANGES AND EXIT
Esc:EXIT WITHOUT SAVING  HOME:SET DEFAULT VALUES

FIG. 3

COMPUTER SYSTEM CAPABLE OF USING REMOVABLE DISK DRIVE AS BOOT DEVICE AND METHOD OF CONTROLLING BOOTSTRAP

BACKGROUND OF THE INVENTION

The present invention relates to a computer system and a method of controlling the bootstrap and, more particularly, to a computer system capable of using a removable disk drive such as a CD-ROM drive as a boot device, and a method of controlling the bootstrap.

In a personal computer, a floppy disk drive or a hard disk drive has conventionally been used as a boot device for bootstrapping the operating system.

Recently, specifications for performing a bootstrap from a CD-ROM drive are determined, and corresponding CD-ROM media are being commercially available. These specifications use a CD-ROM medium on which an operating system and CD-ROM driver software are recorded. The use of this CD-ROM medium enables bootstrapping the operation system from the CD-ROM drive in powering up the personal computer, similarly to a boot from an FDD or an HDD.

Most of CD-ROM drives incorporated in personal computer main bodies are IDE drives, which receive power from the personal computer main bodies. A CD-ROM drive of this type employs a tray scheme excellent for a small size and an easy medium exchange operation. The CD-ROM drive of the tray scheme has an EJECT button for drawing out the tray, and a recent tray is of an electromagnetic locking scheme. If the computer main body is not powered up, the tray cannot be drawn out even upon depressing the EJECT button.

Since the tray is not opened even upon depressing the EJECT button while the personal computer is OFF, a CD-ROM medium cannot be loaded in the CD-ROM drive with the personal computer being OFF. Even if the bootstrap is desired to be executed from the CD-ROM medium, the boot CD-ROM medium cannot be inserted. When the personal computer is powered up in this state, even if the boot is set to be preferentially performed from the CD-ROM, the bootstrap is undesirably executed from the FDD or the HDD having a next boot priority because no CD-ROM medium is loaded.

BRIEF SUMMARY OF THE INVENTION

It is an object of the present invention to provide a computer system capable of providing the user with a physical environment capable of bootstrapping an operating system from a boot device even when the computer system is powered up while no medium is loaded in a drive designated as the boot device, and a method of controlling the bootstrap.

According to the present invention, there is provided a computer system capable of using a removable disk drive arranged to allow exchange of a storage medium, as a boot device for bootstrapping an operating system, comprising storage medium detection means for detecting whether the storage medium is loaded in the removable disk drive, means for, when the storage medium detection means detects that no storage medium is loaded in the removable disk drive, controlling the removable disk drive to shift the removable disk drive to a state in which a user can load or exchange the storage medium, and means for providing the user with a physical environment capable of loading the storage means in the removable disk drive.

This computer system can be constituted to use a removable drive such as a CD-ROM drive as a boot device. When this computer system is powered up, whether a storage medium is loaded in the removable drive designated as a boot device is checked. If the storage medium is loaded, a bootstrap process from the storage medium normally starts; if no storage medium is loaded, a physical environment capable of loading the storage medium in the removable drive is provided to the user by, e.g., automatically opening the electromagnetic locking tray of the removable drive, instead of a direct shift to another boot device having a next higher priority. When the storage medium is loaded in the removable drive, the operating system is boot-strapped from the removable drive.

Even if, therefore, the computer system is powered up while the user forgets to load the CD-ROM medium in the CD-ROM drive with the electromagnetic locking tray which is designated as a boot device, the boot from the CD-ROM medium can be easily performed.

A process of bootstrapping the operating system from the removable disk drive such as the CD-ROM drive is frequently used to reinstall the operating system in a hard disk. For this reason, when the boot from the removable disk drive such as the CD-ROM drive is performed, it is preferable that boot priority order information be automatically rewritten to automatically change a next top-priority boot device to another disk drive such as a hard disk drive, other than the removable disk drive.

With this processing, if the bootstrap is temporarily executed after the boot priority order information is set to use the CD-ROM drive as a top-priority boot device, a subsequent bootstrap can be executed from a floppy disk, a hard disk, or the like without resetting the boot priority order information.

The boot from the removable disk drive such as the CD-ROM drive may be executed regardless of the set contents of the above-described boot priority order information when a predetermined key on a keyboard is depressed. With this processing, the boot from the removable disk drive such as the CD-ROM drive can be performed without changing the boot priority order information from a default state.

Instead of opening the tray, a message that prompts insertion of the storage medium may be displayed on the screen. Since the computer is kept on in the message display stage, the user can draw out the tray with an EJECT button or the like to mount the boot medium on the tray.

As described above, according to the present invention, even if the computer system is powered up while no medium is loaded in a drive designated as a boot device, the user can be provided with a physical environment capable of bootstrapping the operating system from the boot device. The bootstrap from the removable drive in which a medium can be inserted and exchanged only upon powering up the computer main body can be efficiently realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 is a view showing an example of a setup screen used in the computer system according to this embodiment;

DETAILED DESCRIPTION OF THE INVENTION

An embodiment of the present invention will be described below with reference to the several views of the accompanying drawing.

Figure 1:
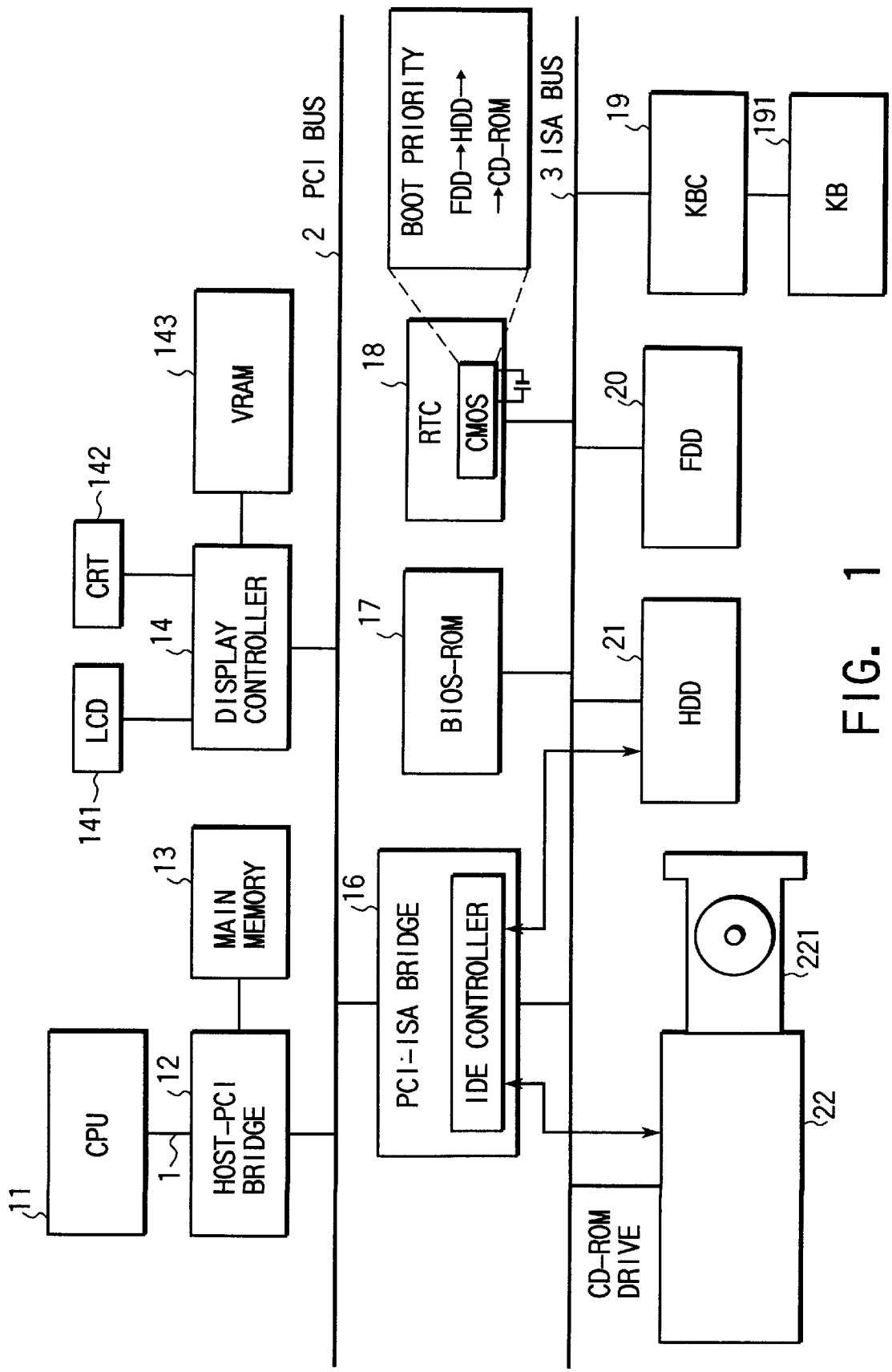
FIG. 1 is a block diagram showing the overall arrangement of a computer system according to an embodiment of the present invention.

FIG. 1 shows the arrangement of a computer system according to an embodiment of the present invention. This computer system is a notebook personal computer incorporating a CD-ROM drive. As shown in FIG. 1, the computer main body comprises a processor bus 1, a PCI bus 2, an ISA bus 3, a CPU 11, a host-PCI bridge 12, a main memory 13, a display controller 14, a PCI-ISA bridge 16, a BIOS-ROM 17, a real-time clock (RTC) 18, a keyboard controller 19, a floppy disk drive (FDD) 20, a hard disk drive (HDD) 21, a CD-ROM drive 22, and the like.

The CPU 11 executes a program in the main memory 13 to control the overall operation of the computer system, and is realized by, e.g., a microprocessor "Pentium" available from Intel Corp., USA. The I/O pin of the CPU 11 is directly coupled to the processor bus 1.

The main memory 13 is a memory device storing an operating system, device drivers, an application program to be executed, processing data, and the like, and is constituted by a plurality of DRAM modules. The main memory 13 is connected to the host-PCI bridge 12 via a dedicated memory bus.

The host-PCI bridge 12 is a bridge LSI connecting the processor bus 1 and the PCI bus 2, and functions as one of the bus masters of the PCI bus 2. The host-PCI bridge 12 has a function of bidirectionally converting a bus cycle containing data and addresses between the processor bus 1 and the PCI bus 2, a function of controlling access to the main memory 13 via the memory bus, and the like.

The display controller 14 is one of PCI devices, and controls an LCD 141 connected to the computer main body or an external CRT display 142 to display data written in a video memory (VRAM) 143 on the LCD 141 or the CRT display 142.

Figure 2A:
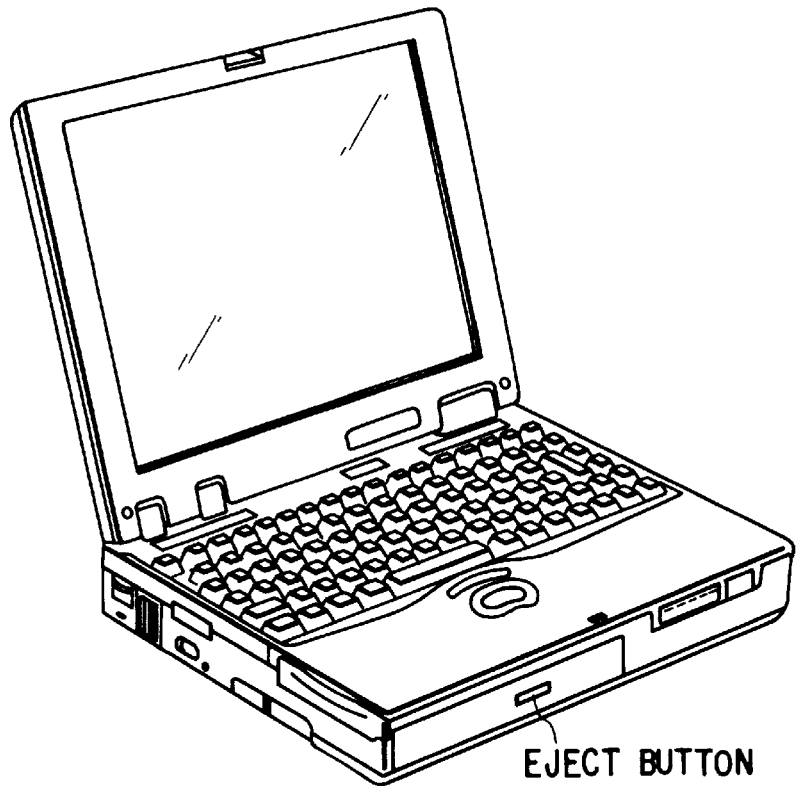
FIGS. 2A and 2B are perspective views, respectively, showing the outer appearance of the computer system according to this embodiment.
Figure 2B:
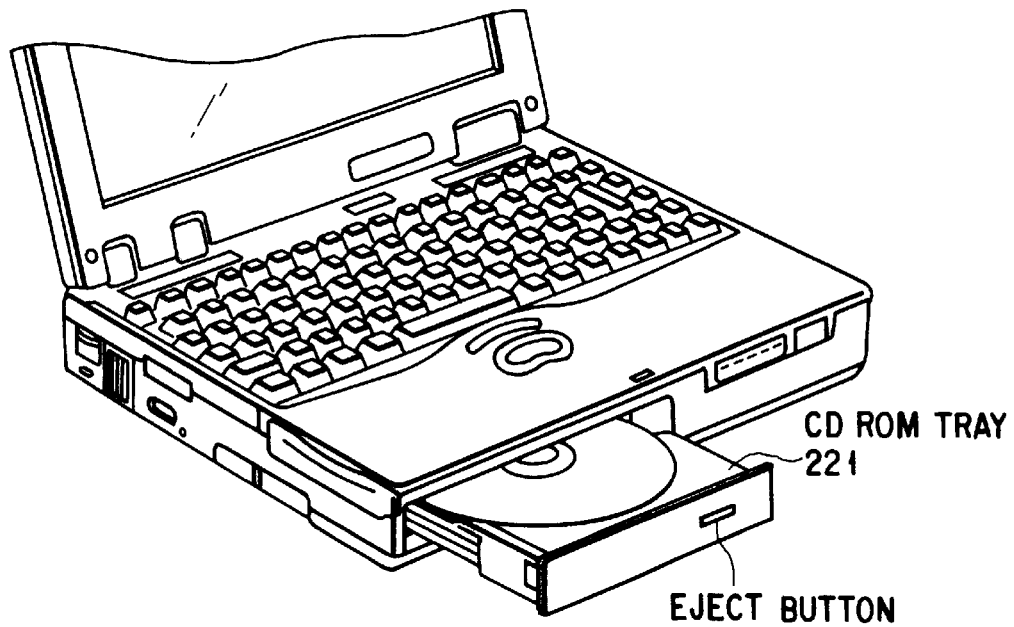

The PCI-ISA bridge 16 is a bridge LSI connecting the PCI bus 2 and the ISA bus 3, and functions as one of the PCI devices. The PCI-ISA bridge 16 incorporates an IDE controller for controlling an IDE device on the ISA bus 3. In the system of FIG. 1, the HDD 21 and the CD-ROM drive 22 are IDE devices, which are accommodated in the computer main body and receive operating power from the computer main body. FIGS. 2A and 2B show the outer appearance of the computer main body incorporating the CD-ROM drive 22 therein.

As shown in FIGS. 2A and 2B, the CD-ROM drive 22 comprises an electromagnetic locking CD-ROM tray 221 for mounting a CD-ROM medium thereon, and an EJECT button for opening the electromagnetic locking CD-ROM tray 221. If the EJECT button is depressed while the computer main body is powered up, the electromagnetic locking CD-ROM tray 221 externally slides and is drawn out, as shown in FIG. 2B. Consequently, a CD-ROM medium can be loaded. However, when the computer main body is OFF, the electromagnetic lock is not released even upon depressing the EJECT button, and the CD-ROM tray 221 cannot be drawn out. In this embodiment, the boot device is the CD-ROM drive 22 (the CD-ROM drive 22 is designated as a top-priority boot drive, or a boot cannot be performed from an FDD or an HDD having a higher priority and is performed from the CD-ROM drive 22). In this case, if no CD-ROM medium is loaded, the CD-ROM drive 22 is controlled to automatically open the CD-ROM tray 221. This mechanism is realized using a system BIOS.

This system BIOS is stored in the BIOS-ROM 17 in FIG. 1. The system BIOS is a program positioned between the operating system and the application program, and the hardware, and contains a POST (Power On Self Test) program which is first executed upon powering up the computer system, various device driver programs for hardware access, a setup program for setting the system environment, and in addition a boot up program for controlling a bootstrap.

This boot up program has a function of checking whether a CD-ROM medium is loaded in the CD-ROM drive 22 in order to realize the bootstrap from the CD-ROM drive 22, a function of automatically opening the electromagnetic tray of the CD-ROM drive 22 to prompt the user to insert the CD-ROM medium, a function of reading at least a program required to boot the operating system from the CD-ROM medium, from a boot area set at a predetermined position of the CD-ROM medium, and the like. The procedure of this boot up program will be explained with reference to FIG. 4 and subsequent drawing.

The RTC 18 in FIG. 1 is a timepiece module which manages the current time, and incorporates a CMOS memory backed up by its own battery. This CMOS memory is used to store setup information designating the system operating environment. The setup information contains boot priority order information (Boot Priority) representing a boot device from which the bootstrap is preferentially executed, and the like. The user can use the setup program of the system BIOS to update various set contents of the setup information. FIG. 3 shows an example of a setup screen (SYSTEM SETUP) provided by the setup program of the system BIOS. As shown in FIG. 3, the set item of the boot priority order information (Boot Priority) is displayed on the setup screen, in addition to various environment setting items associated with the memory, the display, the hard disk, the password, and the I/O port. In default boot priority order information, the boot priority order is FDD→HDD→CD-ROM drive. If the user sets the cursor at the setting item of the boot priority order information (Boot Priority), and depresses a back space key, the boot priority order toggles such as HDD→FDD→CD-ROM, CD-ROM→FDD→HDD, and FDD→HDD→CD-ROM every depression.

The procedure of the boot up process will be described below with reference to a flow chart in FIG. 4.

When the personal computer is powered up, the POST program of the system BIOS is first executed to execute a memory check and initialization of various hardware units (step S101). Then, control is transferred to the boot up program. The boot up program first reads the boot priority order information set in the CMOS memory to check whether the boot device is the CD-ROM drive 22 (step S102). If the CD-ROM drive 22 is the boot device (if the CD-ROM drive 22 is designated as a top-priority boot drive, or if a boot cannot be performed from an FDD or an HDD having a higher priority and is performed from the CD-ROM drive 22), the boot up program checks whether a CD-ROM medium is loaded in the CD-ROM drive 22 (step S103).

The presence/absence of loading of the CD-ROM medium is checked by issuing, to the controller of the CD-ROM drive 22, a medium sense command present in a standard command set for controlling the CD-ROM drive 22, and checking the response.

If it is detected that no CD-ROM medium is loaded, the boot up program issues a tray open command to the CD-ROM drive 22 to cause the CD-ROM drive 22 to open the electromagnetic locking CD-ROM tray 221 (step S104). With this process, a physical environment allowing the user to load the CD-ROM medium is realized.

During a predetermined timeout period, the boot up program periodically issues a status check command for checking whether the electromagnetic locking CD-ROM tray 221 is closed, and continuously monitors a change in status of the electromagnetic locking tray 221 (steps S105, S106, and S107). If it is detected during the timeout period that the electromagnetic locking tray 221 is closed, or the time is out before the electromagnetic locking tray 221 is closed, the boot up program issues the medium sense command again to confirm again whether the CD-ROM medium is inserted (step S108). When the user inserts the CD-ROM medium and closes the tray 221, insertion of the CD-ROM medium is detected. To the contrary, when the user closes the tray 221 without inserting any CD-ROM medium, or the time is out in step S107, no CD-ROM medium is inserted.

If insertion of the CD-ROM medium is confirmed, the boot up program checks whether the CD-ROM medium is a bootable CD-ROM medium (step S109). If YES in step S109, the boot up program reads a boot area present at a predetermined position on the CD-ROM medium, loads a bootstrap program stored at this position in the main memory 13 in order to boot the OS main body, and transfers control to the program, i.e., the OS on the CD-ROM medium (step S110).

If the CD-ROM medium is not a bootable medium in which no bootstrap program is written in the boot area, a message that the type of CD-ROM medium is different is displayed on the screen, or the boot is tried from the FDD or the HDD having the next priority order (step S111).

If it is determined in step S108 that the CD-ROM medium is not inserted, a process is started for booting the OS from FDD 20 or HDD 21 having the higher priority order next to the CD-ROM drive 22 (step S110).

If insertion of the CD-ROM medium is confirmed upon the check of the presence/absence of insertion of the CD-ROM medium that is first performed in step S103, the processes in steps S104 through S108 are not executed, and the flow directly shifts to step S109 to execute the process of checking whether the CD-ROM medium is a bootable medium, and the process of booting the OS from the CD-ROM drive 22.

In this manner, when the boot priority is set to the CD-ROM drive, and the personal computer is powered up while no CD-ROM medium is mounted on the tray 221, the tray open command is output to the controller of the CD-ROM drive 22 to automatically pull out the tray 221. Only by inserting the CD-ROM medium and closing the tray 221, the user can start the boot of the OS from the CD-ROM drive 22.

With this operation, even when the user forgets to insert a CD-ROM medium, and the computer is powered up, if the user inserts the CD-ROM medium, the boot can be performed from the CD-ROM, as scheduled, without independently performing the boot from an FDD or an HDD.

Figure 5:
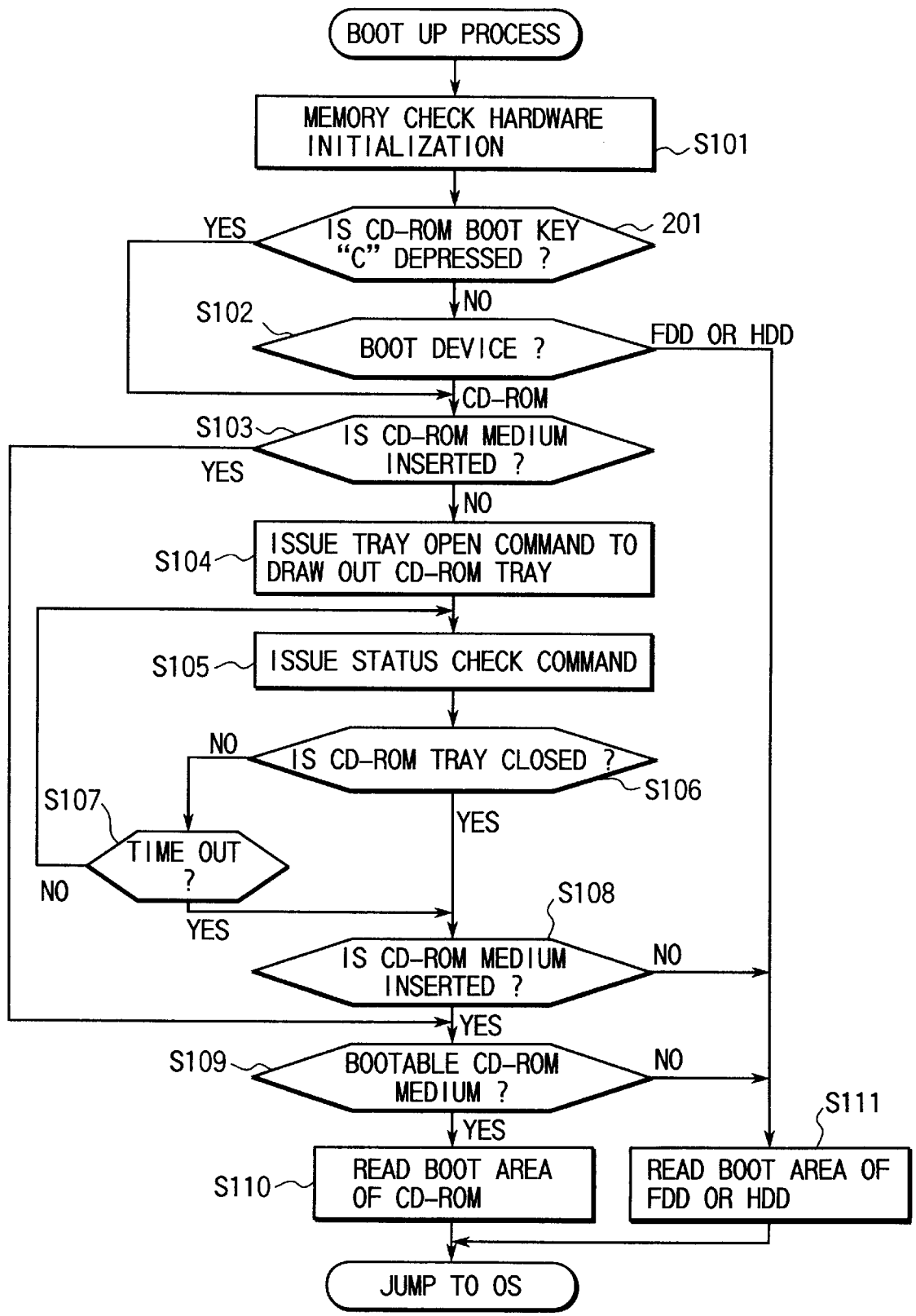
FIG. 5 is a flow chart showing the second boot up process procedure applied to the computer system according to this embodiment.

FIG. 5 shows the second procedure of the boot up process.

Figure 4:
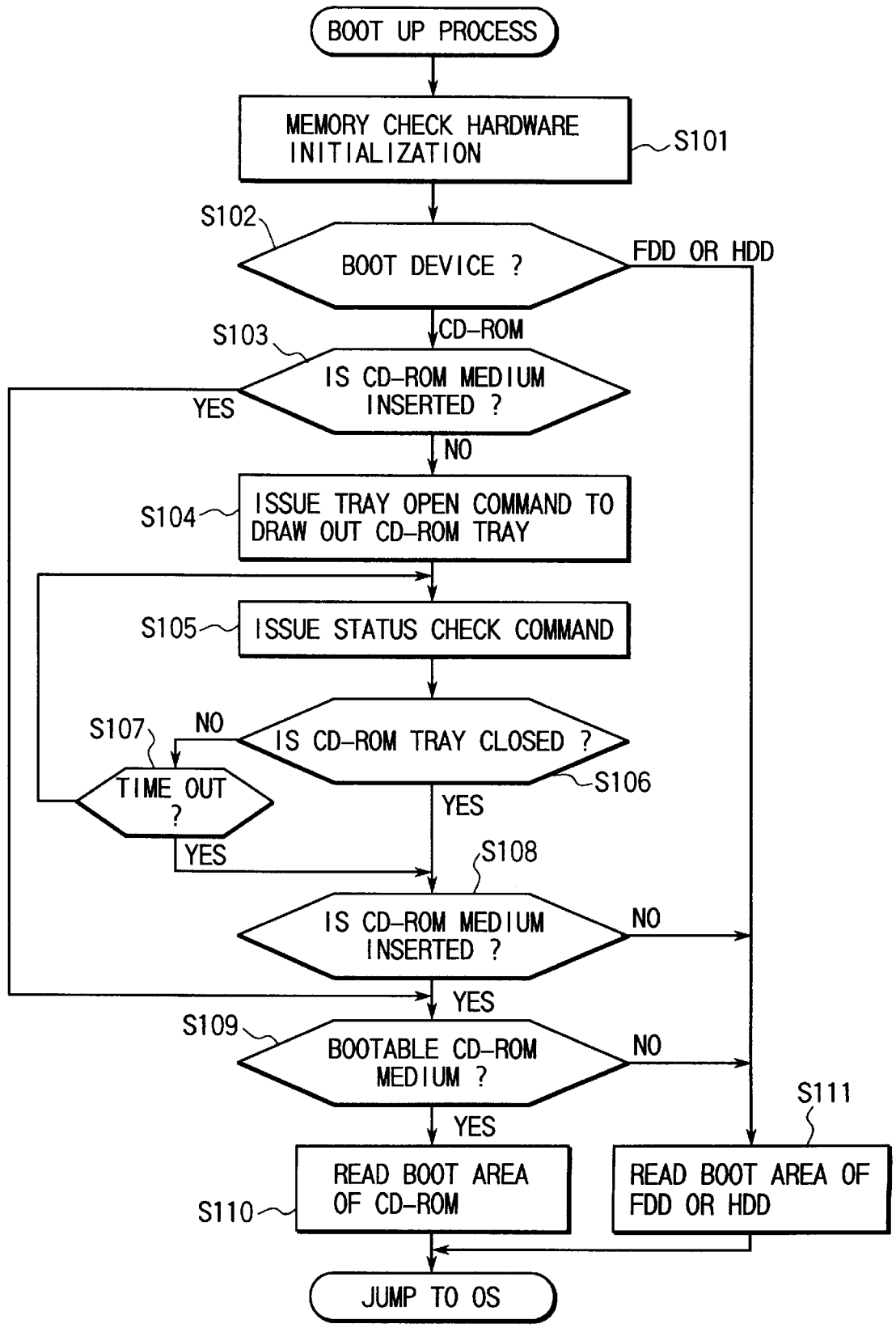
FIG. 4 is a flow chart showing the first boot up process procedure applied to the computer system according to this embodiment.

In the second procedure, step S201 of detecting whether a predetermined key (e.g., a letter key "C") on a keyboard 191 that is assigned as a key for designating the boot of the OS from the CD-ROM drive 22 is depressed is added between steps S101 and S102 in FIG. 4. If depression of the key "C" is detected in step S201, the flow branches to step S103 without executing the check of boot priority order information in step S102.

When the computer is powered up while the user depresses the key "C", or when the computer is powered up, and then the user depresses the key "C" before completion of initialization in step S101, the CD-ROM drive 22 is recognized as a top-priority boot device regardless of the contents of the boot priority order information of the CMOS memory, and the above-described processes in step S103 and subsequent steps are executed. With this processing, the boot from the CD-ROM drive 22 can be easily performed without resetting the boot priority order information of the CMOS memory. This means that, when, e.g., the OS must be reinstalled from a CD-ROM medium due to an error in the OS installed in a hard disk, even if no CD-ROM medium is inserted in advance, an environment capable of reinstalling the OS from the CD-ROM medium can be realized only by powering up the computer while the key "C" is depressed.

Figure 6:
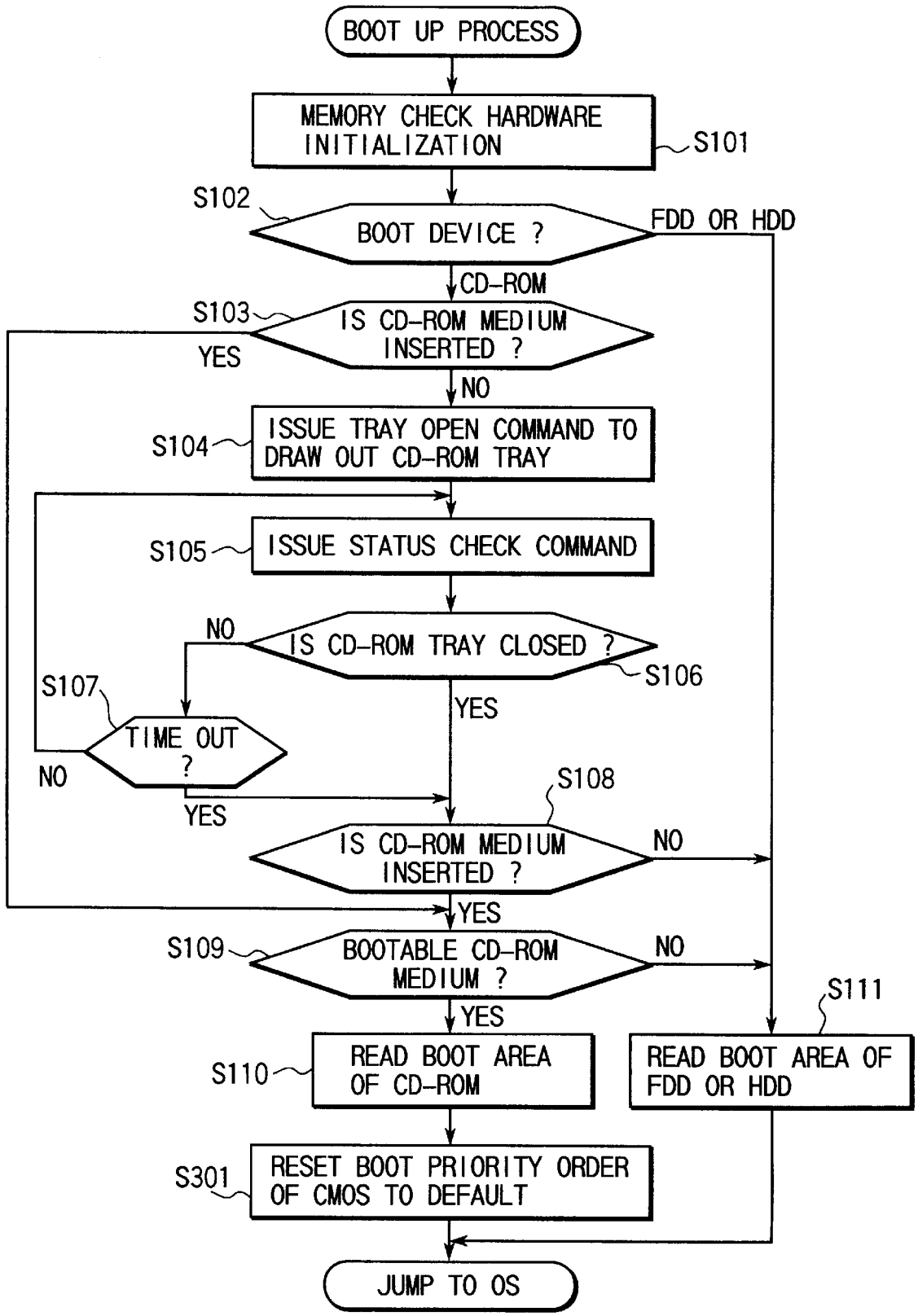
FIG. 6 is a flow chart showing the third boot up process procedure applied to the computer system according to this embodiment.

FIG. 6 shows the third procedure of the boot up process.

In the third procedure, the process (step S301) of automatically updating the boot priority order information of the CMOS to reset the boot priority order information to a default value or the contents of boot priority order information one before the CD-ROM is set as a top-priority boot device is added after the process in step S109 in FIG. 4. After step S301, control is transferred to the OS.

With this mechanism, if the boot priority order information is temporarily set to use the CD-ROM drive 22 as a top-priority boot device, and then the boot-strap is executed, the bootstrap can be normally executed from the floppy disk drive 20 or the hard disk drive 21 without resetting the boot priority order information.

Figure 7:
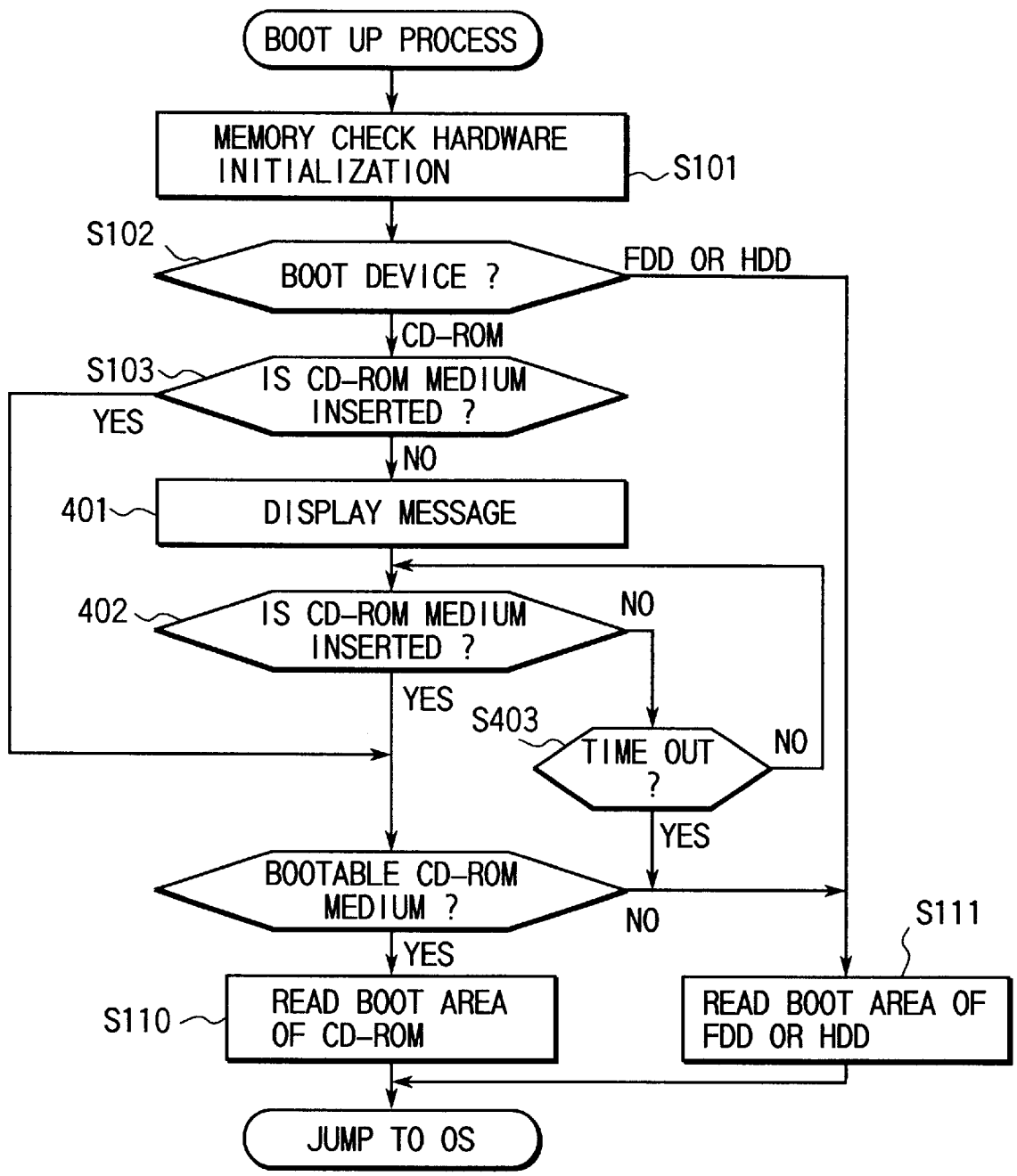
FIG. 7 is a flow chart showing the fourth boot up process procedure applied to the computer system according to this embodiment.

FIG. 7 shows the fourth procedure of the boot up process.

In the fourth procedure, processes in steps S401 through S403 are executed instead of the processes in steps S104 through S108 in FIG. 4.

More specifically, when it is detected in step S103 that no medium is inserted in the CD-ROM drive 22 designated as a top-priority boot device, the boot up program displays, on the screen, a message that prompts the user to insert the boot CD-ROM medium in the CD-ROM drive 22, instead of opening the tray 221 (step S401). Since the computer is kept on in this stage, the user can draw out the tray 221 with the EJECT button to mount the boot CD-ROM on the tray 221. Thereafter, the boot up program periodically issues a medium sense command to check whether the CD-ROM medium is mounted before the lapse of a predetermined timeout period (steps S402 and S403). If the CD-ROM medium is mounted before the lapse of the timeout period, the flow shifts to the above-mentioned process in step S109 to execute the boot from the CD-ROM medium. On the other hand, if the time is out before the CD-ROM medium is mounted, the flow shifts to step S110 described above to execute the boot process from an FDD or an HDD as a boot device having the next priority order.

In step S402, it is possible to detect whether the status of the tray 221 changes, i.e., the tray 221 is temporarily opened and then closed, and at the detection point to determine whether the CD-ROM medium is mounted.

The above embodiment has exemplified the boot from the CD-ROM drive 22 having the electromagnetic locking tray 221. However, the present invention can also be applied to other various removable drives such as an MO drive and a DVD drive in addition to the CD-ROM drive as far as the drive has a mechanism in which a medium can be inserted/exchanged only upon supplying power. Also, the present invention is not limited to a drive of the tray scheme, and is applicable to, e.g., a drive of a caddie scheme having an electromagnetic locking opening/closing cover.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A computer system including a plurality of disk drives as boot devices for bootstrapping operating systems, comprising:
    a removable disk drive which is arranged to allow loading or exchange of a storage medium, has a first state in which a user can load or exchange said storage medium, and a second state in which the user cannot load or exchange said storage medium, and is mechanically set in one of the states, said removable disk drive being usable as a boot device for bootstrapping an operating system;
    means for storing boot priority order information representing, of a plurality of disk drives usable as said boot device, a disk drive from which the bootstrap is preferentially performed;
    bootstrap control means for executing a bootstrap process in accordance with the boot priority order information when said computer system is powered up, said bootstrap control means including:
        storage medium detection means for detecting whether said storage medium is loaded in said removable disk drive when said removable disk drive is designated as a top-priority boot device by the boot priority order information; and
        means for, when said storage medium detection means detects that no storage medium is loaded in said removable disk drive, controlling said removable disk drive to shift a state of said removable disk drive from the second state to the first state, thereby providing the user with a physical environment capable of loading said storage medium in said removable disk drive, before a shift to a bootstrap process from a disk drive having a next higher priority.

2. A system according to claim 1, wherein said removable disk drive has a tray for mounting a disk, said tray being slidably arranged between a closed position where said tray is accommodated in a main body of said drive, and an open position where said tray is externally drawn out from said drive main body, and
    said means for controlling said removable disk drive to shift said removable disk drive from the second state to the first state moves said tray from the closed position to the open position so as to allow the user to mount said disk on said tray.

3. A system according to claim 1, further comprising:
    means for automatically updating, after the bootstrap process is completed, the boot priority order information to reset the boot priority order information to a default value or the contents of priority order information one before the removable disk drive is set as a top-priority boot device.

4. A system according to claim 1, further comprising means for automatically rewriting the boot priority order information so as to change said top-priority boot device from said removable disk drive to another disk drive each time a process for bootstrapping the operating system from said removable disk drive is executed.

5. A system according to claim 1, further comprising:
    key input detection means for detecting presence/absence of a predetermined key input designating that the operating system is bootstrapped from said removable disk drive; and
    means for recognizing said removable disk drive as said top-priority boot device regardless of contents of the boot priority order information when said key input detection means detects the predetermined key input.

6. A bootstrap control method which is used in a computer system including a plurality of disk drives as boot devices for bootstrapping operating systems, having a removable disk drive capable of exchanging a storage medium, and mechanically set in one of a first state in which a user can load or exchange said storage medium, and a second state in which the user cannot load or exchange said storage medium, and controls a bootstrap process of an operating system from said removable disk drive, comprising the steps of:
    storing boot priority order information representing, of a plurality of disk drives usable as said boot device, a disk drive from which the bootstrap is preferentially performed;
    detecting whether said storage medium is loaded in said removable disk drive when said removable disk drive is designated as a top-priority boot device by the boot priority order information; and
    controlling, when said detection step detects that no storage medium is loaded in said removable disk drive, said removable disk drive to shift a state of said removable disk drive from the second state to the first state, thereby providing the user with a physical environment capable of loading said storage medium in said removable disk drive, before a shift to a bootstrap process from a disk drive having a next higher priority.

7. A computer system including a plurality of disk drives as boot devices for bootstrapping operating systems, comprising:

a removable disk drive which is arranged to allow loading or exchange of a storage medium, as a boot device for bootstrapping an operating system;

means for storing boot priority order information representing, of a plurality of disk drives usable as said boot device, a disk drive from which the bootstrap is preferentially performed; and bootstrap control means for executing a bootstrap process in accordance with the boot priority order information when said computer system is powered up, said bootstrap control means including:

storage medium detection means for detecting whether said storage medium is loaded in said removable disk drive when said removable disk drive is designated as a top-priority boot device by the boot priority order information; and means for, when said storage medium detection means detects that no storage medium is loaded in said removable disk drive, displaying a message for urging a user to load said storage medium in said removable disk drive before a shift to a bootstrap process from a disk drive having a next higher priority, and detecting again whether said storage medium is loaded in said removable disk drive; and means for executing the bootstrap from said removable disk drive when loading of said storage medium in said removable disk drive is detected by said second storage medium detection means.

8. A system according to claim 7, further comprising:

means for shifting the bootstrap to the bootstrap process from said disk drive having the next higher priority when loading of said storage medium is not detected.

9. A system according to claim 7, further comprising:

means for repetitively detecting for a predetermined period of time whether or not said storage medium is loaded in said removable disk drive after the message is displayed; and means for executing the boot process from the storage medium as the boot device having next priority order when the storage medium is not in said removable disk drive during the predetermined period of time.

10. A bootstrap control method which is used in a computer system including a plurality of disk drives as boot devices for bootstrapping operating systems, having a removable disk drive arranged to allow loading or exchange of a storage medium, as a boot device for bootstrapping an operating system, comprising the steps of:

storing boot priority order information representing, of a plurality of disk drives usable as said boot device, a disk drive from which the bootstrap is preferentially performed;

executing a bootstrap process in accordance with the boot priority order information when said computer system is powered up;

detecting whether said storage medium is loaded in said removable disk drive when said removable disk drive is designated as a top-priority boot device by the boot priority order information;

displaying, when said detection step detects that no storage medium is loaded in said removable disk drive, a message for urging a user to load said storage medium in said removable disk drive, before a shift to bootstrap process from a disk drive having a next higher priority;

detecting again whether said storage medium is loaded in said removable disk drive; and executing the bootstrap from said removable disk drive when loading of said storage medium in said removable disk drive is detected.

* * * * *